June 20, 1961  R. L. DALTON  2,988,975
PHOTOGRAPHIC CAMERA
Filed Oct. 26, 1959
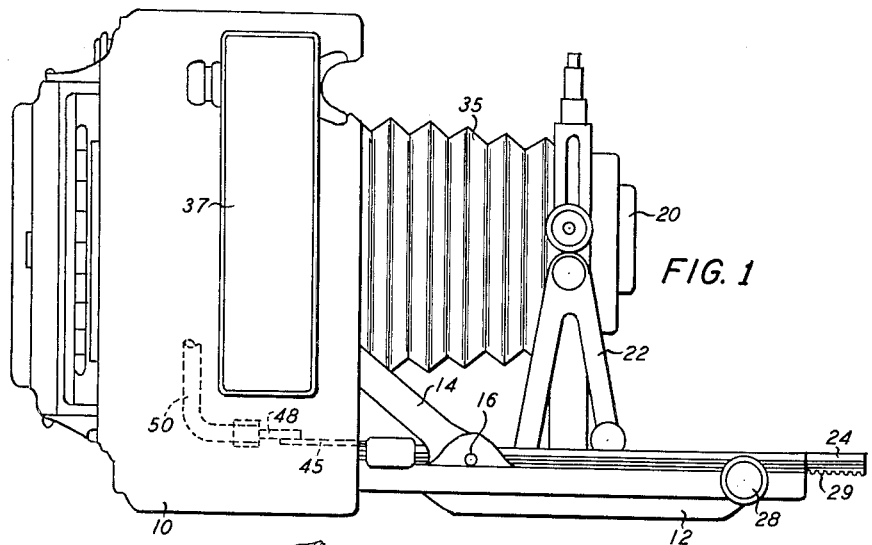
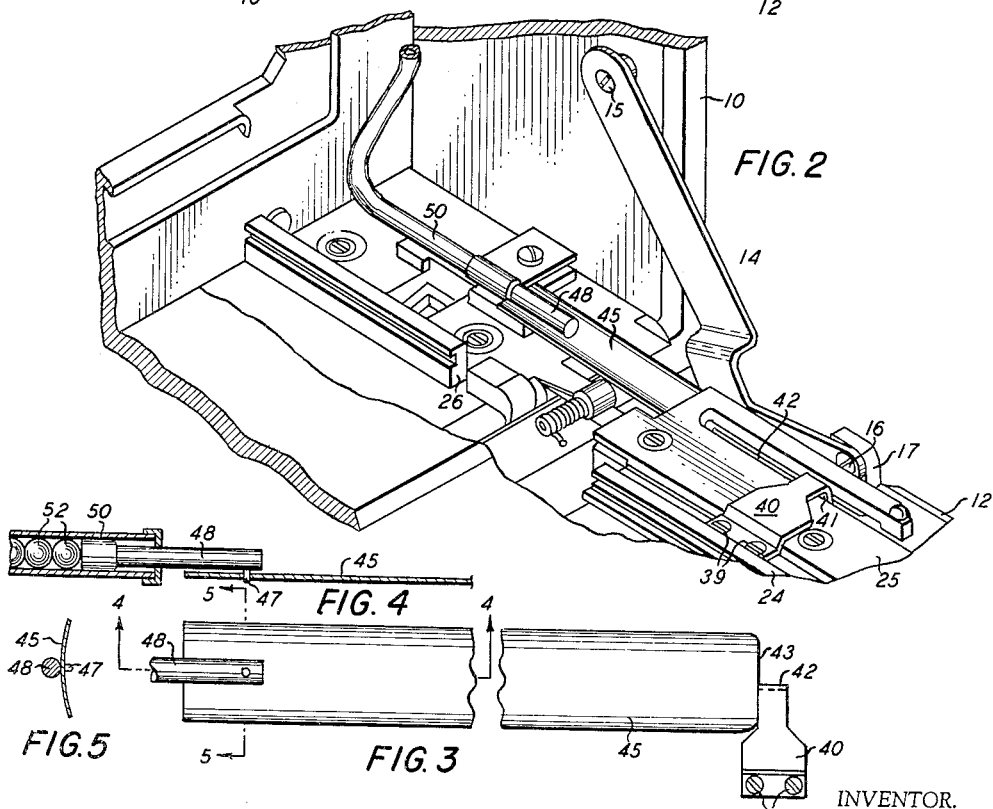
INVENTOR.
ROBERT L. DALTON
BY
*B. J. Schlesinger*
ATTORNEY

United States Patent Office 2,988,975
Patented June 20, 1961

2,988,975
PHOTOGRAPHIC CAMERA
Robert L. Dalton, Pittsford, N.Y., assignor to Graflex, Inc., Rochester, N.Y., a corporation of Delaware
Filed Oct. 26, 1959, Ser. No. 848,618
2 Claims. (Cl. 95—44)

The present invention relates to photographic cameras, and more particularly to photographic cameras provided with rangefinders. In a still more specific aspect, the invention relates to photographic cameras of the folding type having means for coupling a rangefinder to the lens board, or other lens support of the camera to effect setting of the rangefinder with focusing adjustment of the camera. Still more specifically, the invention constitutes an improvement applicable to a rangefinder coupling mechanism such as shown in U.S. Patent No. 2,713,815, granted July 26, 1955 jointly to Oscar Steiner and the present inventor.

It is common practice to attach a rangefinder to a camera so that the camera may be focused properly upon the object which is to be photographed. Conventional attached rangefinders have two mirrors or reflectors, one of which is fixed and the other of which is pivoted and is coupled to the lens board or support for the front lens of the camera so that, when the lens board or support is moved in or out along the camera bed, the pivoted mirror or reflector will be swung on its axis of rotation. One of the mirrors is of the semi-transparent type. The user, upon looking into the eyepiece of the rangefinder, sees two images of the object to be photographed, both of which are visible through the semi-transparent mirror, one being visible directly, and the other being reflected from the other mirror or reflector. By adjusting the lens board or lens support of the camera forward or back these two images may be brought together. When this is done, the camera is in proper focus.

One disadvantage of prior types of coupling mechanisms has been that, when used with a folding camera, the lens board of the camera has had to be adjusted precisely prior to folding the camera; otherwise the coupling mechanism will not be aligned properly to fold, and will stick. This is an annoyance, but the photographer must always take time to position the lens board at infinity position, before attempting to fold the bed of the camera; otherwise he will have difficulty.

A primary object of the present invention is to provide a lens-rangefinder coupling mechanism for folding cameras which will permit the camera readily to be closed, and which does not have to be positioned so precisely to permit closing of the camera.

Another object of the invention is to provide a coupling mechanism for a coupled rangefinder which is simple in construction, and relatively inexpensive.

Other objects of the invention will be apparent hereinafter from the specification and from the recital of the appended claims.

In the drawing:

FIG. 1 is a side elevation of a folding camera in open position and having attached thereto a rangefinder such as may be operated by the coupling mechanism of the present invention, the coupling mechanism being shown fragmentarily and in dotted lines;

FIG. 2 is a fragmentary perspective view on an enlarged scale showing details of the coupling mechanism and of associated parts of the camera;

FIG. 3 is a fragmentary plan view on an enlarged scale of a portion of the coupling mechanism;

FIG. 4 is a fragmentary section taken on the line 4—4 of FIG. 3 looking in the direction of the arrows; and FIG. 5 is a section on the line 5—5 of FIG. 3 looking in the direction of the arrows.

Referring now to the drawing by numerals of reference, 10 denotes the box or case of a conventional camera, such as a "Speed Graphic" camera, although it is to be understood that the invention may be used with other types of folding cameras. 12 designates the door of this camera which becomes a bed for the camera focusing mechanism when the door is open. The door or bed 12 is hinged to the camera box or casing 10 in conventional manner, and is held in unfolded, operative position by the side arms 14. These side arms are disposed at opposite sides of the bed; and each is pivotally connected at one end by means of a stud 15 to the inside of a side wall of the box or housing 10, and is pivotally connected at its opposite end by means of a pin 16 to an ear 17 which is integral with the bed 12.

The objective or front lens 20 of the camera is mounted in conventional manner in the lens board of the camera, which is supported in conventional manner by means of brackets 22 from a slide 24 which is adapted to be adjusted back and forth in conventional manner in a pair of parallel guide rails 25. The rails 25 are aligned with parallel guide rails 26 in the camera case; and the slide 24 is mounted to slide in the rails 26 in conventional manner. The slide 24 is adjusted as usual by the focusing knob 28 (FIG. 1). This knob carries pinions (not shown) which engage racks 29 formed on the undersides of the slide 24. The camera is provided with the usual bellows 35 to one end of which the lens board is connected in conventional manner.

37 denotes the rangefinder of the camera which may be like that shown in Patent No. 2,713,815 above mentioned, or be of other conventional construction. It is secured in usual fashion to one side of the box or case 10.

With the present invention, the slide 24 has a plate 40 secured to it at one side by screws 39. This plate extends over the adjacent guide rail 25 and has a downturned end 41 which engages in an elongate slot 42 formed in this guide rail. It contacts the outer, forward end 43 of a steel strap 45, made of thin, flexible feeler gauge steel stock, such as is commonly employed for feeler gauges. Adjacent its other end, this strap 45 is connected by a pin 47 with a plunger 48.

The plunger 48 is mounted to reciprocate in one end of a tube 50, which is secured in the box 10, and which is similar to the tube 50 disclosed and described in Patent No. 2,713,815 above mentioned. This tube contains a series of balls 52; and the plunger 48 at its inner end engages with the lowermost of this series. The balls abut against one another and transmit the motion of the plunger to mechanism, such as described in the Patent No. 2,713,815, which operates the rangefinder.

The strap 45 may be curved transversely, as shown in FIG. 5 to give it strength and lateral stability.

From the preceding description, it will be seen that as the slide 24 is moved back and forth in the camera case by focusing adjustment of the lens, such motion is imparted through the plate 40 to the strap 45, the plunger 48 and the balls 52 to actuate the rangefinder. A spring (not shown but such as shown in Patent No. 2,713,815) in tube 50 constantly holds the lowermost ball 52 in engagement with the inner end of the plunger 48.

When the camera is to be folded the strap 45 will readily fold without any permanent damage to itself. It will not take any permanent crease. Thus it is not necessary to precisely position the slide 24 on the guide rails 25 before closing the camera.

Because of the simple construction of the mechanism described accuracy and low cost are achieved. At the same time because of the flexibility of the strap 45, the door or bed of the camera can readily be folded without interference in any way from the rangefinder coupling mechanism.

While the invention has been described in connection with a specific embodiment thereof, it will be understood that it is capable of further modification, and this application is intended to cover any variations, uses, or adaptations of the invention following, in general, the principles of the invention, and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. In a camera having a case, a bed hingedly secured at its bottom to the front of said case and adapted to be swung from closed position in which it covers the front of said case to its operative position in which it projects forwardly from the bottom of the case, a lens support, ways in said case and on said bed on which said lens support is slidably adjustable forwardly and rearwardly for focusing the camera, and a rangefinder attached to said case, means coupling said lens support to the rangefinder to adjust said rangefinder upon focusing adjustment of said lens support, said means comprising an actuating member attached to said lens support to move forwardly and rearwardly therewith, a thin flexible spring-metal strap positioned to have its front end engaged by and held against said actuating member whereby it will be pushed rearwardly upon rearward movement of said actuating member and it will follow said actuating member forward upon forward movement thereof, said strap having parallel top and bottom surfaces but being slightly curved in transverse section and means connecting said strap to said rangefinder to operate said rangefinder upon longitudinal movement of said strap.

2. A camera as claimed in claim 1 wherein said top surface is convex and said bottom surface is concave.

References Cited in the file of this patent

UNITED STATES PATENTS

| | | |
|---|---|---|
| 2,584,818 | Smith | Feb. 5, 1952 |
| 2,717,543 | McCathron | Sept. 13, 1955 |

FOREIGN PATENTS

| | | |
|---|---|---|
| 599,981 | Germany | July 12, 1934 |